US010302995B2

(12) United States Patent
Frisken et al.

(10) Patent No.: US 10,302,995 B2
(45) Date of Patent: May 28, 2019

(54) HIGH REFLECTIVITY LCOS DEVICE (71) Applicants: Finisar Corporation, Horsham, PA (US); Steven James Frisken, Vaucluse (AU); Qihong Wu, Campsie (AU)

(72) Inventors: Steven James Frisken, Vaucluse (AU); Qihong Wu, Campsie (AU)

(73) Assignee: Finisar Corporation, Horsham, PA (US)

( * ) Notice: Subject to any disclaimer, the term of this patent is extended or adjusted under 35 U.S.C. 154(b) by 184 days.

(21) Appl. No.: 15/038,037

(22) PCT Filed: Nov. 13, 2014

(86) PCT No.: PCT/US2014/065526
§ 371 (c)(1),
(2) Date: May 19, 2016

(87) PCT Pub. No.: WO2015/077127
PCT Pub. Date: May 28, 2015

(65) Prior Publication Data
US 2016/0291405 A1 Oct. 6, 2016

Related U.S. Application Data (60) Provisional application No. 61/907,314, filed on Nov. 21, 2013.

(51) Int. Cl.
*G02F 1/1333* (2006.01)
*G02F 1/1335* (2006.01)
*G02F 1/1362* (2006.01)

(52) U.S. Cl.
CPC .. *G02F 1/133553* (2013.01); *G02F 1/133504* (2013.01); *G02F 1/136277* (2013.01);
(Continued)

(58) Field of Classification Search
CPC ............. G02F 1/1326; G02F 1/133553; G02F 1/133504; G02F 1/136277;
(Continued)

(56) References Cited

U.S. PATENT DOCUMENTS 7,343,064 B2 * 3/2008 Koyama ........... G02F 1/133553
349/193
2005/0237475 A1 * 10/2005 Chou ................ G02F 1/133553
349/198
(Continued)

FOREIGN PATENT DOCUMENTS

WO     2013117903 A1     8/2013

OTHER PUBLICATIONS

"International Search Report" for International Patent Application No. PCT/US2014/065526, dated Mar. 5, 2015, 3 pages, Korean Intellectual Property Office, Daejeon Metropolitan City, Republic of Korea.

(Continued)

Primary Examiner — Charles S Chang
(74) Attorney, Agent, or Firm — Kurt Rauschenbach; Rauschenbach Patent Law Group, LLC (57) ABSTRACT Described herein is a spatial light modulator (15) for modulating the phase, retardation or polarization state of an incident optical signal propagating in a first dimension. The optical phase modulator (15) includes a liquid crystal material (17) and a pair of electrodes (19 and 21) for supplying an electric potential across the liquid crystal material (17) to drive liquid crystals in a predetermined configuration. Modulator (15) also includes a diffractive optical element (29) disposed adjacent a first electrode (19). Element (29) includes a first array of diffractive elements (31) formed of a first material having a first refractive index and extending in a second dimension substantially perpendicular to the first dimension. Elements (31) are at least partially surrounded by a second material (33) formed of a lower refractive index.

25 Claims, 7 Drawing Sheets (52) U.S. Cl.
CPC .... *G02F 2201/305* (2013.01); *G02F 2203/12* (2013.01); *G02F 2203/22* (2013.01); *G02F 2203/50* (2013.01)

(58) Field of Classification Search
CPC ........... G02F 2201/305; G02F 2203/12; G02F 2203/22; G02F 2203/50
USPC .......................................................... 349/30
See application file for complete search history.

(56) References Cited

U.S. PATENT DOCUMENTS

| | | |
|---|---|---|
| 2006/0256263 A1 | 11/2006 | Shimizu et al. |
| 2007/0070276 A1 | 3/2007 | Tan et al. |
| 2008/0218862 A1 | 9/2008 | Kekas |
| 2013/0070326 A1 | 3/2013 | Frisken et al. |

OTHER PUBLICATIONS

"Written Opinion" for International Patent Application No. PCT/US2014/065526, dated Mar. 5, 2015, 8 pages, Korean Intellectual Property Office, Daejeon Metropolitan City, Republic of Korea.
"Notification Concerning Transmittal of International Preliminary Report on Patentability (Chapter I of the Patent Cooperation Treaty)" for International Patent Application No. PCT/US2014/065526, dated Jun. 2, 2016, 10 pages, International Bureau of WIPO, Geneva, Switzerland.

\* cited by examiner

HIGH REFLECTIVITY LCOS DEVICE

CROSS-REFERENCE TO RELATED APPLICATION

This application is a 35 U.S.C. § 371 application based on PCT/US14/65526 filed Nov. 13, 2014, entitled "High Reflectivity LCOS Device" which claims priority to U.S. Provisional Patent Application Ser. No. 61/907,314, filed Nov. 21, 2013, entitled "High Reflectivity LCOS Device". The entire disclosures of these applications are incorporated herein by reference.

FIELD OF THE INVENTION

The present invention relates to optical signal manipulation devices and in particular to a high reflectivity liquid crystal on silicon (LCOS) optical phase modulator. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Figure 1:
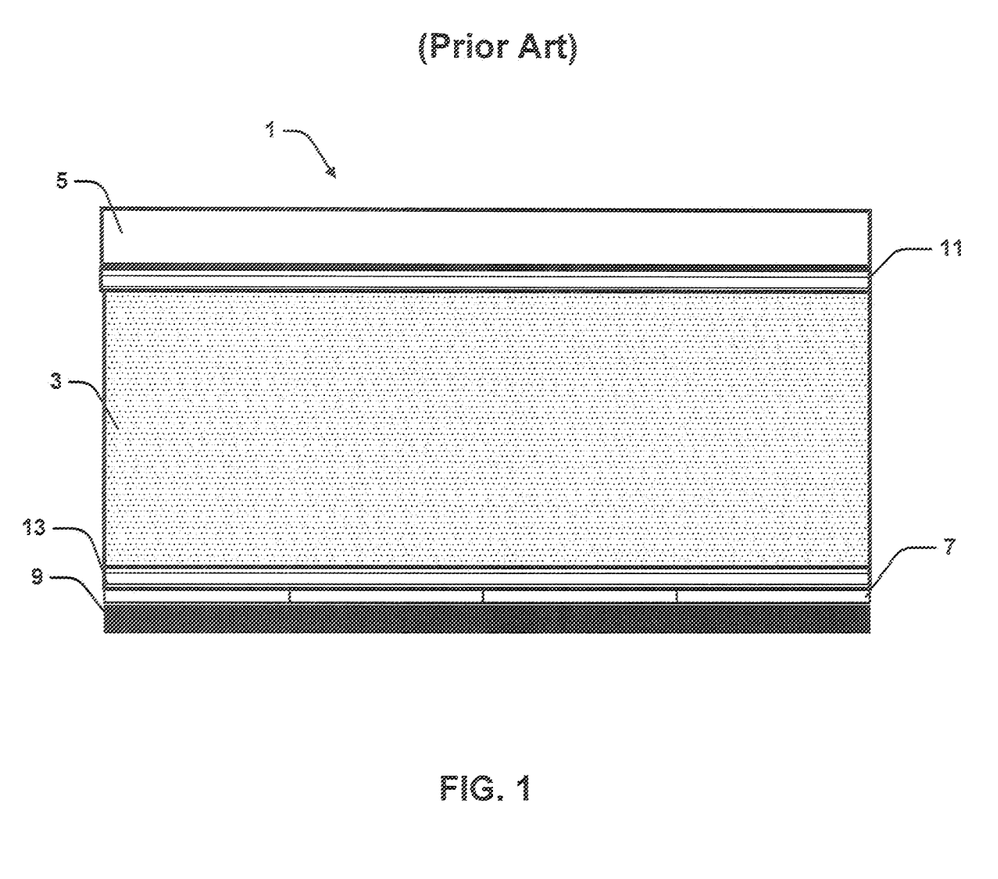
FIG. 1 is a sectional side view of a LCOS type liquid crystal device known in the art.

Referring to FIG. 1, there is illustrated schematically a conventional LCOS device 1 including a liquid crystal material 3 sandwiched between a transparent glass layer 5 having a transparent electrode, and a mirror 7 mounted on a silicon substrate 9. The mirror is divided into a two-dimensional array of individually addressable pixels. Each pixel is individually drivable by a voltage signal to provide a local phase change to at least one polarization component of an optical signal, thereby providing a two-dimensional array of phase, optical retardation or polarization manipulating regions. Pre-alignment of the liquid crystal materials within material 3 is provided by alignment layers 11 and 13. These layers generally include a plurality of small grooves induced by rubbing of the polyamide layers or other commonly employed techniques, which align the long axis of the individual liquid crystals to define the slow axis of the liquid crystal material.

LCOS devices are known to suffer diffractive optical losses due to the pixilated electrode structure. Previous efforts to remove the diffractive optical losses associated with the pixel structure involve overcoating the LCOS with a multilayer dielectric coating. These techniques have not been overly successful due primarily to the inherent voltage drop over the large number of overcoat layers required to suppress the pixel structure. This leads to increased loss due to fringing fields (the effective phase pattern produced by the combination of pixels) at the transitions between high and low voltage states. Also the stress of the coating makes it difficult to achieve an optically flat LCOS, which is important for many applications.

To address a separate problem of polarization dependence in liquid crystal devices, US Patent Application Publication 2013/0070326 entitled "Polarization-Independent LCOS Device" to Frisken et al. and assigned to Finisar Corporation discloses use of subwavelength structures to provide a polarization independent LCOS device. This is achieved through manipulation of the phase of the s and p polarization states using a metallic subwavelength structure. While these types of devices are advantageous for maintaining polarization independence, use of a pixilated subwavelength structure necessarily adds to diffraction losses. Further, the addition of a metal layer adds to absorption losses.

SUMMARY OF THE INVENTION

It is an object of the invention, in its preferred form to provide an improved or alternative high reflectivity LCOS device.

In accordance with a first aspect of the present invention there is provided a spatial light modulator configured to modulate the phase, retardation or polarization state of an incident optical signal propagating at least partially in a first dimension, the optical phase modulator including:
  a liquid crystal material;
  a pair of electrodes for supplying an electric potential across said liquid crystal material to drive liquid crystals in a predetermined configuration; and
  a first diffractive optical element disposed between the electrodes for at least partially reflecting the incident optical signal;
  wherein the diffractive optical element includes a first array of diffracting formations formed of a first material having a first refractive index and extending in a second dimension substantially perpendicular to the first dimension, the formations being at least partially surrounded by a second material formed of a lower refractive index.

In one embodiment the first diffractive optical element is preferably disposed between the liquid crystal material and the first electrode. In another embodiment the first diffractive optical element is preferably disposed within the liquid crystal material.

The first and second materials are preferably non-metallic. The first material is preferably silicon and the second material is preferably silicon dioxide ($S_iO_2$).

The thickness of the silicon material in the first dimension is preferably in the range of 100 nm to 400 nm. More preferably, the thickness of the silicon material in the first dimension is 200 nm.

The thickness of the silicon dioxide material in the first dimension is preferably in the range of 100 nm to 400 nm. More preferably, the thickness of the silicon dioxide material in the first dimension is 250 nm.

In one embodiment the diffracting formations are preferably spaced apart in the first dimension by a fixed periodicity. In another embodiment the diffracting formations are preferably spaced apart in the first dimension by a variable periodicity. The diffracting formations are preferably spaced apart in the first dimension by a periodicity that is in the same order as the wavelength of the incident optical signal. The periodicity is preferably in the range 500 nm to 1000 nm. More preferably the periodicity is 850 nm. The duty cycle of the first array is preferably 0.35.

In one embodiment, the spatial light modulator preferably includes a second diffractive optical element disposed between the electrodes and including a second array of diffracting formations. Preferably at least one of the first or second diffractive optical elements is disposed within the liquid crystal material. More preferably, the first and second diffractive optical elements are disposed within the liquid crystal material.

The first and second arrays preferably have different periodicities. The first and second arrays preferably have different thicknesses in the first dimension.

The first diffractive optical element preferably also functions as an alignment layer to align the liquid crystals within the liquid crystal material.

In accordance with a second aspect of the present invention there is provided a liquid crystal cell, said cell including:
  a liquid crystal material interposed between a first and second surface, said material having a controllable phase, retardation or polarization response to incident input light in accordance with an applied electric field;
  an electric field generation means for generating said electric field across said liquid crystal material so as to thereby provide said controllable phase, retardation or polarization response;
  an anisotropic reflector for reflecting input light, the anisotropic reflector including one or more diffractive optical elements;
  whereby incident input light traverses at least a portion of said liquid crystal material and undergoes a controlled anisotropic reflection from said anisotropic reflector before again traversing said at least a portion of said liquid crystal material before subsequent output.

In accordance with a third aspect of the present invention there is provided a method of manufacturing an optical phase modulator including:
  a) providing a first electrode having a two dimensional array of individually electrically drivable cells;
  b) depositing a first layer formed from a first dielectric material onto the electrode;
  c) depositing a second layer formed from a second dielectric material onto the first layer;
  d) etching a plurality of trenches through the second layer, the trenches extending longitudinally in a first dimension and being spaced apart in a second lateral dimension by a fixed or variable spacing;
  e) depositing a third layer formed from the first dielectric material onto the second layer and into the trenches;
  f) depositing a liquid crystal material over the third layer; and
  g) mounting a second electrode onto the liquid crystal material.

In accordance with a fourth aspect of the present invention there is provided a spatial light modulator including:
  a relative phase manipulation material controllable by an external electric field;
  a pixilated reflective surface reflecting electromagnetic energy in a predetermined wavelength range;
  at least a first diffractive optical element for increasing the degree of reflection in the predetermined wavelength range.

In one embodiment of the fourth aspect, the first diffractive optical element is preferably disposed between the relative phase manipulation material and the reflective surface. In another embodiment of the fourth aspect, the first diffractive optical element is preferably disposed within the relative phase manipulation material.

The spatial light modulator of the fourth aspect preferably includes a first and second diffractive optical element. The first and second diffractive optical elements are preferably spaced apart in a dimension of primary propagation of an incident optical signal. Preferably at least one of the first and second diffractive optical elements are disposed within the relative phase manipulation material. More preferably, both the first and second diffractive optical elements are disposed within the relative phase manipulation material.

The first diffractive optical element preferably includes a series of elongated elements of varying refractive index.

The relative phase manipulation material is preferably a liquid crystal material.

In accordance with a fifth aspect of the present invention there is provided, in an LCOS device of the type having a liquid crystal material for control of the relative phase of orthogonal polarizations in the presence of an external electric field, and a reflective surface structure for reflecting light transmitted through the liquid crystal material back through the material, a method of improving the reflectivity operation of a LCOS device, the method including the step of:
  a) depositing at least a first diffractive structure between the reflective surface and the liquid crystal material.

The method preferably includes the step:
  b) depositing a second diffractive structure between the reflective surface and the liquid crystal material.

The first and second diffractive structures preferably have different periodicity.

BRIEF DESCRIPTION OF THE DRAWINGS

Preferred embodiments of the disclosure will now be described, by way of example only, with reference to the accompanying drawings in which.

DETAILED DESCRIPTION

Single Layer Grating Structure Design

Figure 2:
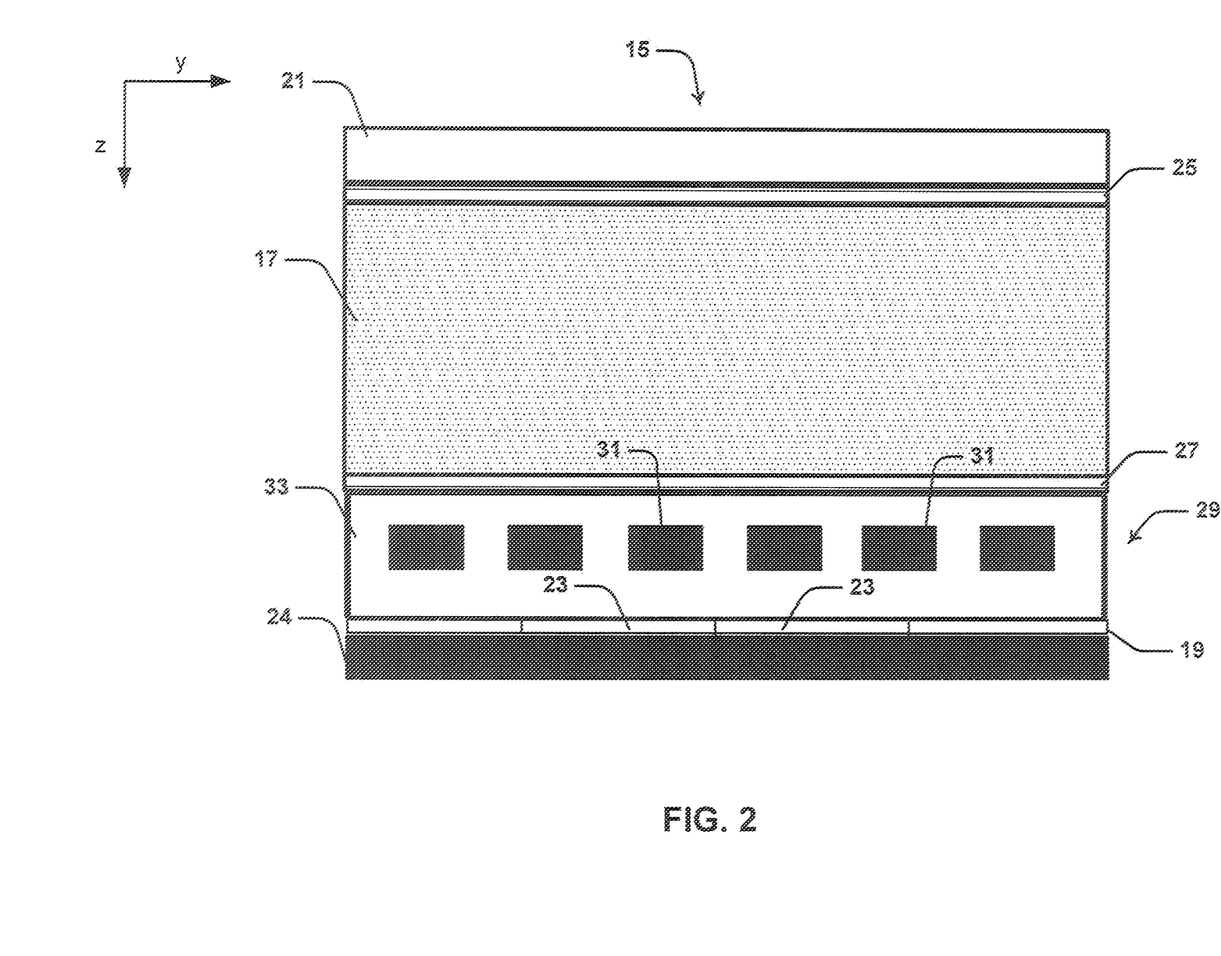
FIG. 2 is a sectional side view of a high reflectivity LCOS device according to a first embodiment, the device having a single embedded grating structure.
Figure 3:
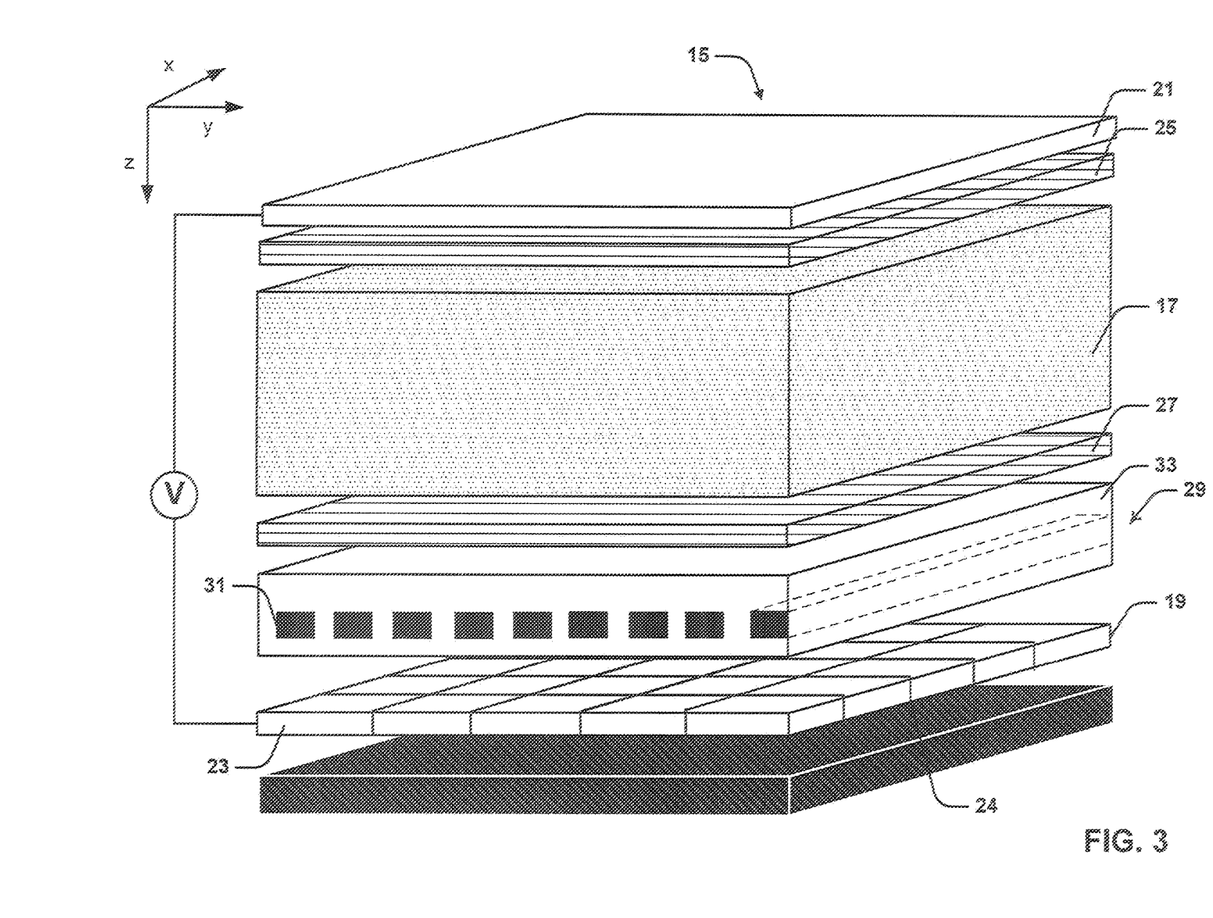
FIG. 3 is an exploded perspective sectional view of the LCOS device of FIG. 2.

Referring to FIGS. 2 and 3 there is illustrated an LCOS type optical phase modulator 15 for modulating the phase of an incident optical signal propagating in a first dimension (z dimension). FIG. 2 illustrates a sectional side view of modulator 15 and FIG. 3 illustrates an exploded sectional perspective view of modulator 15. Modulator 15 includes a liquid crystal material 17 disposed between a pair of opposing electrodes 19 and 21.

Electrodes 19 and 21 are electrically driven for supplying an electric potential V across the liquid crystal material 17 to drive the liquid crystals within material 17 in a predetermined configuration. Electrode 21 is transparent or partially transparent indium-tin-oxide and allows the transmission of the optical signal into and out of modulator 15. Electrode 19 is reflective and includes a grid of individually addressable aluminum pixels 7. Each pixel 23 is drivable at one of a number of predetermined voltage levels to provide a local phase modulation to the incident signal. Electrical control of pixels 23 is provided by interconnections through a silicon substrate 24.

As with the conventional device illustrated in FIG. 1, pre-alignment of the liquid crystal materials within material 17 is provided by alignment layers 25 and 27. Layers 25 and 27 include a plurality of small grooves aligned along a predetermined direction to define the slow axis of the liquid crystal material.

Modulator 15 includes a diffractive optical element in the form of a grating structure 29 disposed between electrode 19 and liquid crystal material 17. Grating structure 29 includes an array of elements 31 formed of silicon and extending longitudinally in the horizontal x dimension, as illustrated by the dashed lines. Elements 31 are at least partially surrounded in two or more dimensions by a significantly lower refractive index silicon dioxide ($SiO_2$) dielectric material 33. Silicon has a refractive index of about 3.4 while silicon dioxide has a refractive index of about 1.5, providing a grating refractive index contrast of about 1.9. The large contrast in refractive index provides a system for which high reflectivities can be achieved over a wide bandwidth. A higher refractive index contrast produces a wider reflection bandwidth. In other embodiments, elements 31 and material 33 are formed of different materials, such as high refractive index germanium and low refractive index aluminum oxide, provided a high contrast in refractive index is maintained. The type of materials are typically selected so as to be compatible with CMOS etching and lithographic fabrication techniques.

In other embodiments, grating structure 29 is disposed within liquid crystal material 17 and material 17 forms the lower refractive index material. In these embodiments, the mechanical structure of grating 29 may act to align the liquid crystals in material 17 and lower alignment layer 27 may not be necessary. In another embodiment, elements 31 are localized in both the x and y dimensions and additional arrays of elements 31 extend in the x dimension to form a two-dimensional grating structure. The two-dimensional grating structures may be symmetric or asymmetric in the different dimensions.

The thickness, period and duty cycle of the grating structure determine the reflectivity properties such as the center wavelengths and bandwidth over which high reflection occurs. The vertical thickness (in the z dimension) determines the band of high reflection with a greater thickness typically providing more narrowband reflection.

For high reflectivity at a wavelength of about 1,550 nm, the dimensions of elements 31 in the y and z dimensions is preferably about 200 nm. The thickness (in the z dimension) of material 33 above elements 31 is about 530 nm and the thickness of material 33 below elements 31 is about 300 nm. The periodicity is about 880 nm and the duty cycle is about 0.35. This duty cycle represents a ratio of 35% silicon to 65% $SiO_2$ along the y-axis of grating structure 29. However, to achieve high reflectivity at other optical wavelengths, the thickness of elements 31 can be made in the range of 100 nm to 400 nm and the thickness of silicon dioxide material 33 can be made in the range of 100 nm to 600 nm. Further, for high reflectivity at other wavelengths and over different bandwidths, the periodicity of elements 31 may be in the range 500 nm to 1000 nm and the duty cycle may vary between 0.2 and 0.8. Although larger ranges may be possible for different systems.

As shown in FIGS. 2 and 3, elements 31 are substantially like in shape and size, and are spaced apart in the y dimension by a fixed periodicity. However, in other embodiments, elements 31 may be different in shape and/or size, and may be spaced apart in the y dimension by a variable periodicity (for example, in a chirped style grating). The degree of periodicity will generally affect the reflectivity profile of the device.

For high reflectivity over a broad bandwidth, elements 31 are preferably spaced apart in the y dimension by a periodicity that is smaller than the wavelength of the incident optical signal but in a similar or the same order or magnitude as that wavelength.

In operation, an incident optical signal passes through transparent electrode 21, alignment layer 25 and liquid crystal material 17. The local phase of the optical signal is modified by the liquid crystal material 17 according to the voltage drive signal applied to the neighboring pixel or pixels 23. Upon reaching grating structure 29, the optical signal is reflected and passed back through element 17, layer 25 and electrode 21. Due to the high contrast and near but sub-wavelength dimensions, a range of wavelengths exists where two zeroth order diffraction modes carry the majority of the energy. That is, the lateral dimension of the grating structure significantly attenuate diffractive orders above the zeroth order. By suitable selection of the grating thickness, the phase change imposed on these modes is such that the transmitted modes experience destructive interference and the signal power is reflected off the grating. This leads to reflectivity up to and exceeding 99%. Further, as electrode 19 is not involved in the reflection, loss due to pixilation effects are significantly reduced.

Unlike devices using additional layers, the use of non-metallic grating structures does not significantly interfere with the electric field applied across the LCOS device. This removes the need to drive the device with otherwise higher voltages.

Reflection off the grating structure reduces optical losses associated with absorption and diffraction that occur from the more conventional reflection off pixilated metal electrode 19.

Figure 4:
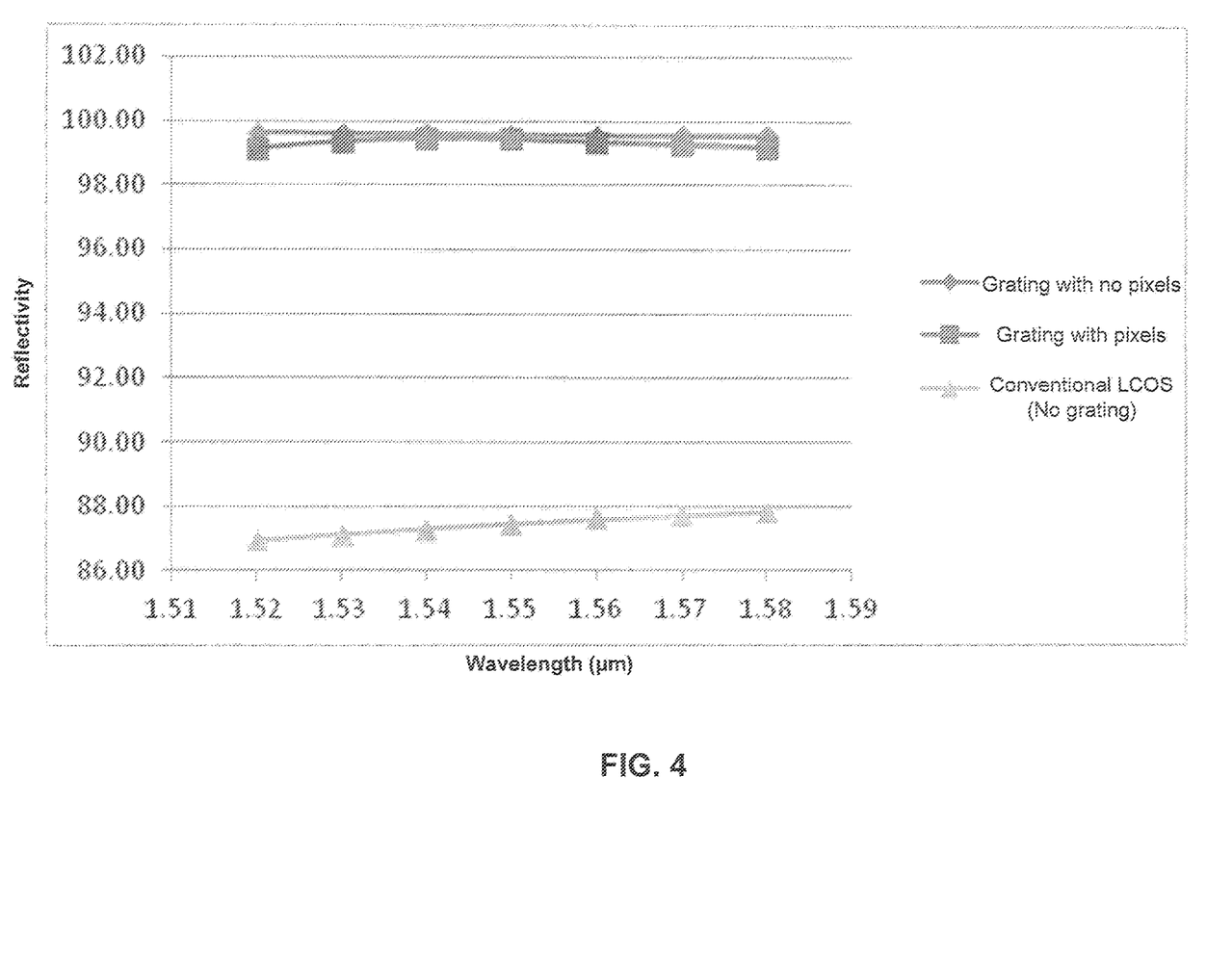
FIG. 4 is a graph showing a comparison of reflectivity versus wavelength for modeled LCOS devices having (i) a grating structure as described herein, (ii) a grating structure plus a pixel structure and (iii) a conventional pixel structure only.

The performance of the above described high reflectance LCOS device was modeled using the GD-Calc modeling software by KJ Innovation. Systems both with and without the aluminum pixels on the driving electrode were modeled. Referring to FIG. 4, there is illustrated model results comparing the high reflectance LCOS device (both with and without pixels) with that of a conventional LCOS having no embedded diffraction grating. The LCOS incorporating the grating structure but no pixels possesses a reflectance of about 99.5% and this high reflectance is maintained essentially constant over a wavelength range of 60 nm between 1,520 nm and 1,580 nm. Adding the pixel structure into the metal layer—which allows for individual addressing of voltages to the liquid crystal material—only reduces the peak reflectance to about 99% at 1,540 nm, with the peak reflectance beginning to drop away slightly over the range between 1,520 nm and 1,580 nm. Comparing this to conventional LCOS designs having aluminum pixel arrays, this represents a significant improvement. To illustrate this, exemplary model data for a conventional LCOS device having no grating is also illustrated in FIG. 4. The conventional LCOS possess a reflectance, taking account of diffractive losses, of about 87% to 88% over the 1,520 nm to 1580 nm range. Accordingly, the addition of the grating structure significantly reduces the optical losses associated with the LCOS pixels.

The periodic nature of the elongate elements 31 are also able to be used for alignment of the liquid crystal material 17. In some embodiments, one or both of alignment layers 25 and 27 are not required and alignment of the liquid crystals within material 17 is provided by the profile of grating structure 29.

By way of example, to manufacture a device as illustrated in FIGS. 2 and 3, a typical LCOS device is subject to a deposition and etching process. Initially, a layer of $SiO_2$ is deposited over pixels 23 of electrode 19. A layer of silicon is then deposited onto the $SiO_2$ layer and trenches extending along the x axis are masked and etched through the silicon layer to form elements 31. The thickness of the silicon layer will define the thickness of elements 31 and the trench width and periodicity will define the lateral dimensions and periodicity of elements 31. The position of the trenches can be independent to the pixel structure so there is no need to align the trench structure with pixels 23. A second $SiO_2$ layer is deposited over the silicon layer and into the trenches between elements 31 to complete grating structure 29. The remaining alignment layers 27 and 25, liquid crystal material 17 and electrode 21 are then deposited and formed onto the $SiO_2$ layer in a conventional manner known in the art.

Two Layer Grating Structure Design

Figure 5:
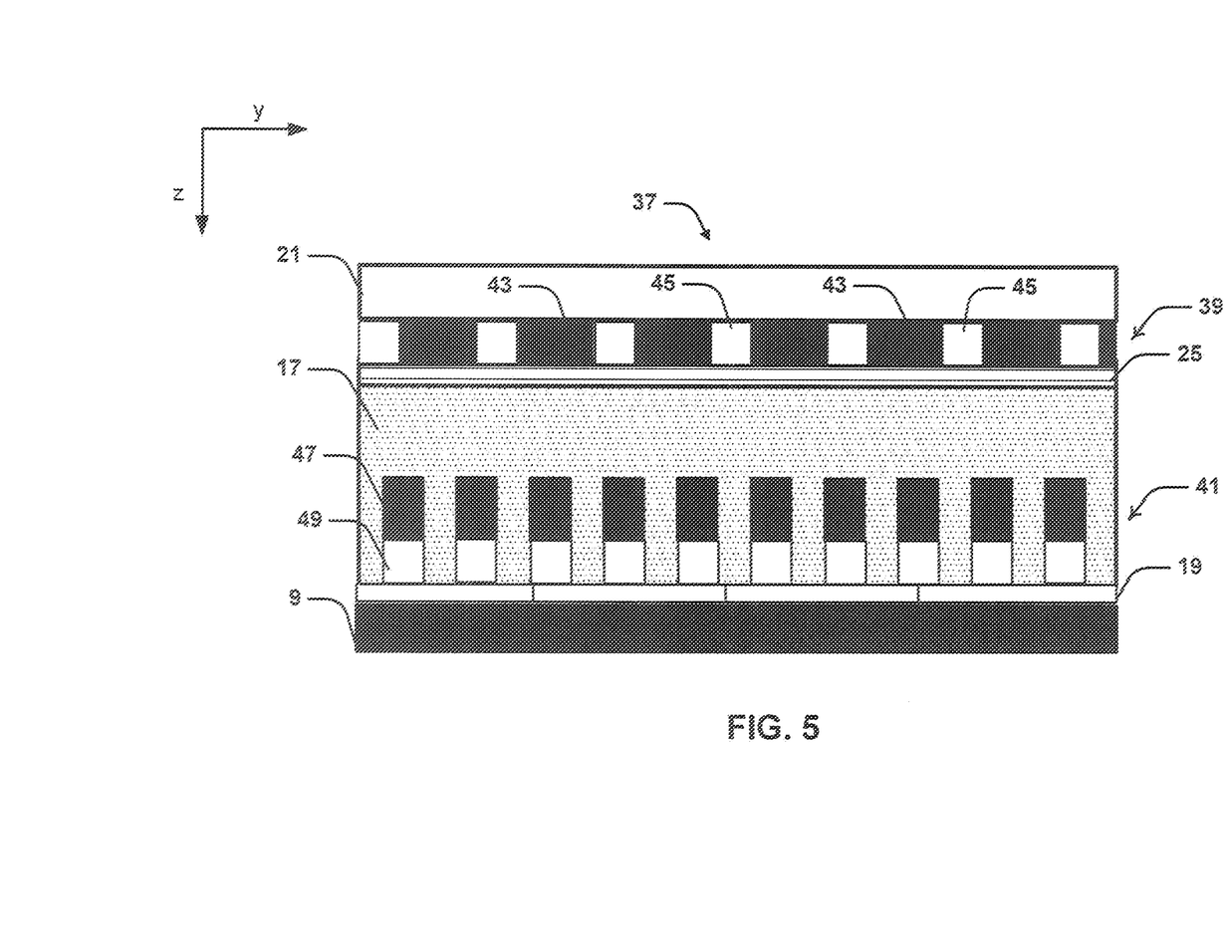
FIG. 5 is a sectional side view of a high reflectivity LCOS device according to a second embodiment, the device having two embedded grating structures.
Figure 6:
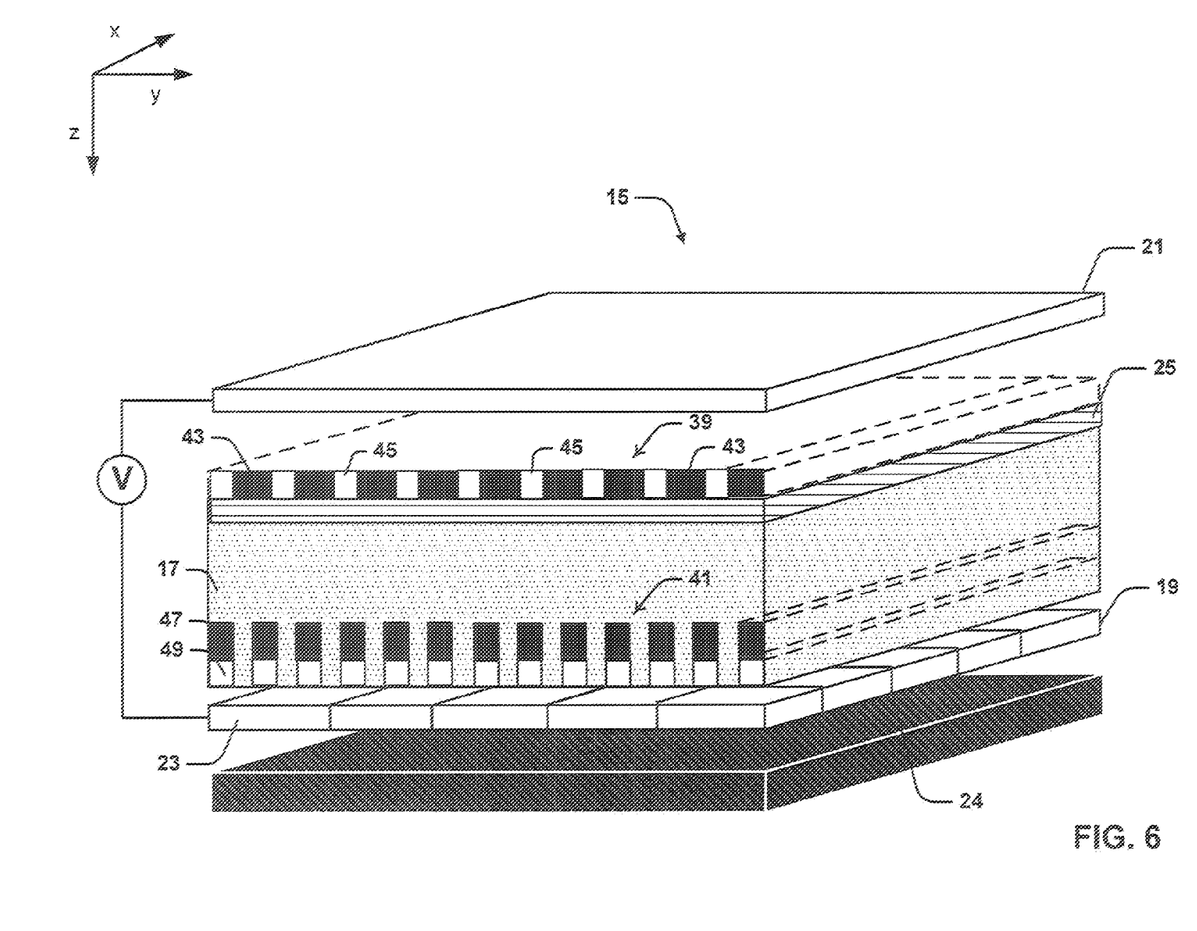
FIG. 6 is an exploded perspective sectional view of the LCOS device of FIG. 5.

Referring now to FIGS. 5 and 6, there is illustrated a second embodiment optical phase modulator 37. Corresponding features of modulator 15 are designated by the same reference numerals. Modulator 37 includes a diffractive optical element in the form of two grating structures 39 and 41. Grating structure 41 is disposed within liquid crystal material 17 and adjacent electrode 19. Grating structures are separated by a predetermined distance in the z dimension. In another embodiment, both grating structures are disposed within liquid crystal material 17. In another embodiment, illustrated in FIG. 7, both grating structures 39 and 41 are disposed between liquid crystal material 17 and electrode 19. In a further embodiment (not shown), grating structure 39 is replaced with a layered dielectric structure.

Grating structure 39 includes a plurality of high refractive index silicon elements 43 separated by a complementary array of lower refractive index $SiO_2$ elements 45. The array of alternating elements extends in the horizontal y dimension and each element 43 and 45 extends longitudinally in the x dimension as shown by the dashed lines in FIG. 6.

Grating structure 41 includes a plurality of high refractive index silicon elements 47 disposed in an array extending along the horizontal y dimension. A like array of lower refractive index $SiO_2$ elements 49 are disposed between elements 47 and electrode 19. Liquid crystal material 17 defines an intermediate layer between grating structures 39 and 41 and fills the space between adjacent silicon elements 47 and adjacent $SiO_2$ elements 49. In another embodiment (not shown), liquid crystal material 17 fills the space between grating structures 39 and 41 and also extends above grating structure 39. In another embodiment, illustrated in FIG. 7, a $SiO_2$ material 53 replaces material 17 and fills the space between grating structures 39 and 41 and the space between silicon elements 43 and 47 of the respective grating structures. Determination of which particular configuration to use (liquid crystal filled or $SiO_2$ filled) depends on the process and specification requirements of the device.

Second grating structure 39 includes a plurality of high refractive index silicon elements 43 disposed in an array extending along the horizontal y axis. As with grating structure 29 of FIGS. 2 and 3, elements 43 extend longitudinally in the horizontal x dimension, as illustrated by the dashed lines in FIG. 6. Grating structure 39 has a different periodicity and thickness to structure 27 and performs a different function, as will be described below.

Figure 7:
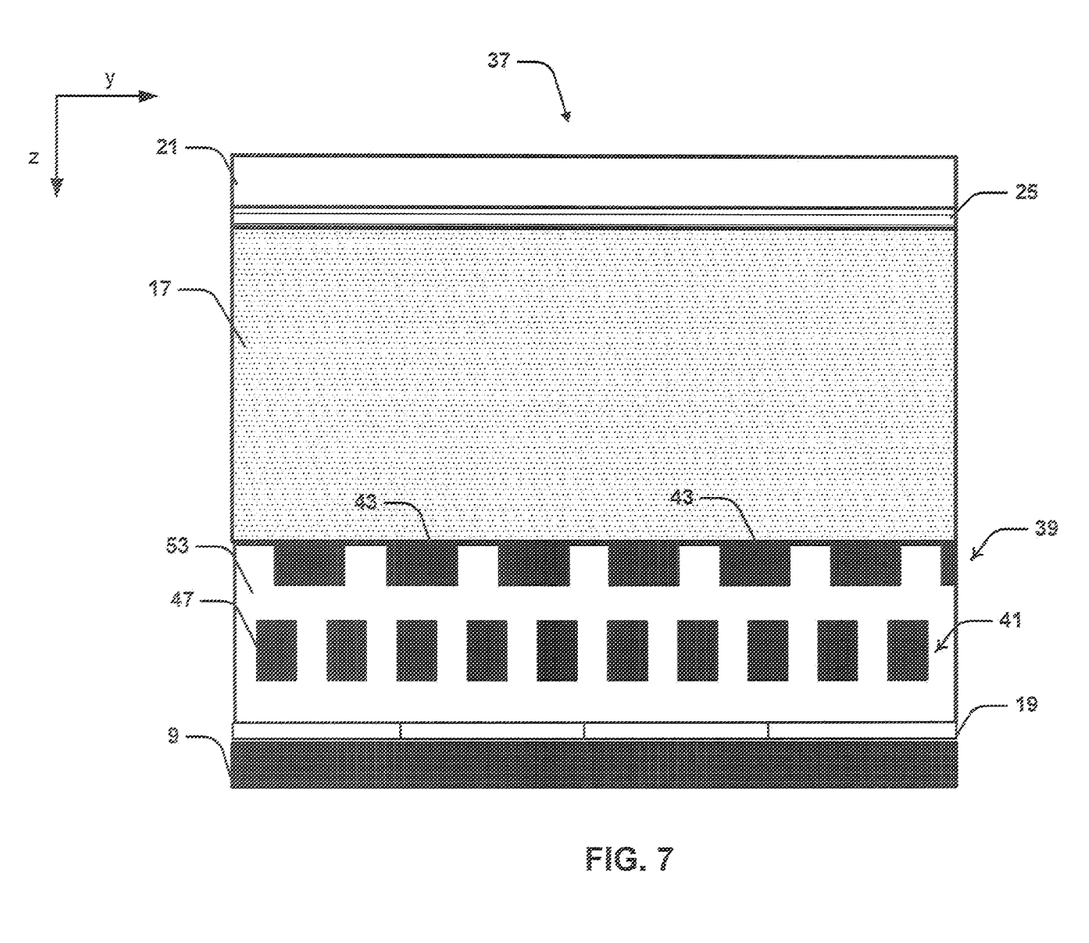
FIG. 7 is a sectional side view of a high reflectivity LCOS device according to a third embodiment.

As illustrated in FIGS. 5 to 7, the silicon elements 47 of grating structure 41 have different dimensions to the silicon elements 43 of grating structure 39. Similarly, the two grating structures have a different periodicity. The dimensions of each grating structure, their respective periodicities and duty cycles, and the spacing between the grating structures are all parameters which determine the reflection properties of phase modulator 37, and are variable on a design basis. Both grating structures preferably include sub wavelength dimensions but in or near the same order of magnitude as the wavelength of incident optical signals.

With reference to FIGS. 5 and 6, in operation, grating structure 39 permits initial passage of the incident optical signal into liquid crystal material 17 and both grating structures 39 and 41 cooperate to form a resonant structure in multiple dimensions. The intermediate liquid crystal layer, defined by material 17, provides an electro-optic layer for electrically controlling the resonance between the two grating structures and hence the resulting phase shift to the incident optical signal.

By selecting an appropriate distance between the first and second grating structures, the reflection and transmission phase of the optical signal through grating structure can be engineered to cover most of a $2\pi$ range while maintaining a high reflection or transmission coefficient. This allows for the high-speed switching of wavelength channels with low loss (2 dB loss or less).

In the near to mid infrared wavelength range the fringing fields increase significantly as the thickness of the LCOS cell increases. This requires higher voltages and the device response slows significantly. The dual grating structure design described above provides enhanced phase control and is beneficial in longer wavelength operation where a conventional liquid crystal layer may be otherwise too thick. For applications at about 1,550 nm and beyond, silicon is very low loss and the thickness of the grating structures can be tuned for specific applications.

In the embodiments illustrated in FIGS. 5 to 7, no lower alignment layer is included as alignment of the liquid crystals can be provided by the mechanical structure of the grating structures or by lines ruled therein. However, alignment layer 25 is included above grating structure 39. In other embodiments, no upper alignment layer 25 is included and liquid crystal material 17 replaces $SiO_2$ elements and extends through to upper electrode 21.

While illustrated as gratings having a periodicity in one dimension, it will be appreciated that, in other embodiments, grating structures 39 and 41 have periodic or partially periodic structure in two dimensions. The periodicity between the two dimensions may be the same (symmetric two dimensional grating) or different (asymmetric two dimensional grating).

By way of example, to manufacture a device as illustrated in FIGS. 5 and 6, a layer of $SiO_2$ material is initially deposited onto pixels 23 of electrode 19. A layer of silicon is then deposited directly onto the $SiO_2$ layer and periodic trenches extending in the x dimension are etched through both layers. Liquid crystal material 17 is then back-filled into the trenches and on top of the $SiO_2$ and silicon layers.

It will be appreciated that the devices described above are capable of being integrated into polarization independent LCOS devices such as those described in US Patent Application Publication 2013/0070326. Further, in some embodiments, polarization independent grating structures are able to be formed with polymer dispersed liquid crystal and symmetric two dimensional grating structures.

CONCLUSIONS

It will be appreciated that the embodiments described above provide an improved or alternative high reflectivity LCOS device.

Embodiments described above relate to a novel diffractive optical grating structure that can be applied to a front surface of an LCOS structure to enhance the reflectivity to greater than about 99% and also to increase the effective fill factor to greater than about 99.5%. Unlike devices using additional layers, the use of non-metallic dielectric grating structures ensures there is no significant reduction in the available voltage or impact to the fringing fields of the electrical drive. Furthermore, reflection off the grating structure reduces optical losses associated with absorption and diffraction that occur from the more conventional reflection off the pixilated metal electrode. This leads to an overall lower optical loss LCOS device. With appropriate dimensions, the LCOS device can be configured to achieve an overall optical loss of 2 dB or less.

INTERPRETATION

Throughout this specification, use of the term "element" is intended to mean either a single unitary component or a collection of components that combine to perform a specific function or purpose.

Throughout this specification, use of the term "orthogonal" is used to refer to a 90° difference in orientation when expressed in a Jones vector format or in a Cartesian coordinate system. Similarly, reference to a 90° rotation is interpreted to mean a rotation into an orthogonal state.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

The drawings described herein are drawn for clarity purposes and are not drawn to scale. The various layers and elements shown may have different relative sizes, shapes and positions, as will be appreciated by persons skilled in the art.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A spatial light modulator including:
a liquid crystal material;
a first and second electrode that provide an electric potential across said liquid crystal material to drive liquid crystals in a predetermined configuration, the first electrode comprising a grid of individually addressable pixels, each pixel being drivable at one of a number of predetermined voltage levels to provide a local phase modulation to an incident optical signal propagating at least partially in a first dimension; and
a first diffractive optical element disposed between the electrodes for at least partially reflecting the incident optical signal;
wherein the first diffractive optical element includes a first array of diffracting formations formed of a first material having a first refractive index and extending in a second dimension substantially perpendicular to the first dimension, the formations being at least partially surrounded by a second material formed of a lower refractive index; and
wherein the spatial light modulator is configured to spatially modulate a phase of the incident optical signal.

2. A spatial light modulator according to claim 1 wherein the first diffractive optical element is disposed between the liquid crystal material and the first electrode.

3. A spatial light modulator according to claim 1 wherein the first diffractive optical element is disposed within the liquid crystal material.

4. A spatial light modulator according to claim 3 wherein the first diffractive optical element also functions as an alignment layer to align the liquid crystals within the liquid crystal material.

5. A spatial light modulator according to claim 1 wherein the first material is silicon and the second material is silicon dioxide ($S_iO_2$).

6. A spatial light modulator according to claim 5 wherein the thickness of the silicon material in the first dimension is in the range of 100 nm to 400 nm.

7. A spatial light modulator according to claim 6 wherein the thickness of the silicon material in the first dimension is 200 nm.

8. A spatial light modulator according to claim 6 wherein the thickness of the silicon dioxide material in the first dimension is in the range of 100 nm to 400 nm.

9. A spatial light modulator according to claim 8 wherein the thickness of the silicon dioxide material in the first dimension is 250 nm.

10. A spatial light modulator according to claim 1 wherein the diffracting formations are spaced apart in the first dimension by a fixed periodicity.

11. A spatial light modulator according to claim 1 wherein the diffracting formations are spaced apart in the first dimension by a variable periodicity.

12. A spatial light modulator according to claim 1 wherein the diffracting formations are spaced apart in the first dimension by a periodicity that is in the same order as the wavelength of the incident optical signal.

13. A spatial light modulator according to claim 12 wherein the periodicity is in the range 500 nm to 1000 nm.

14. A spatial light modulator according to claim 13 wherein the periodicity is 850 nm.

15. A spatial light modulator according to claim 14 wherein the duty cycle of the first array is 0.35.

16. A spatial light modulator according to claim 1 including a second diffractive optical element disposed between the electrodes and including a second array of diffracting formations.

17. A spatial light modulator according to claim 16 wherein at least one of the first or second diffractive optical elements is disposed within the liquid crystal material.

18. A spatial light modulator according to claim 17 wherein the first and second diffractive optical elements are disposed within the liquid crystal material.

19. A spatial light modulator according to claim 16 wherein the first and second arrays have different periodicities.

20. A spatial light modulator according to claim 16 wherein the first and second arrays have different thicknesses in the first dimension.

21. A spatial light modulator according to claim 1 wherein the first and second materials are non-metallic.

22. A method of manufacturing an optical phase modulator including:
a) providing a first electrode having a two dimensional array of individually electrically drivable cells;
b) depositing a first layer formed from a first dielectric material onto the electrode;
c) depositing a second layer formed from a second dielectric material onto the first layer;
d) etching a plurality of trenches through the second layer, the trenches extending longitudinally in a first dimension and being spaced apart in a second lateral dimension by a fixed or variable spacing;
e) depositing a third layer formed from the first dielectric material onto the second layer and into the trenches;
f) depositing a liquid crystal material over the third layer; and
g) mounting a second electrode onto the liquid crystal material.

23. A method of improving a reflectivity operation of an LCOS device the LOCS device comprising:
a liquid crystal material that controls a relative phase of orthogonal polarizations in a presence of an external electric field;
a first and second electrode that provide the external electric field across said liquid crystal material to drive liquid crystals in the liquid crystal material in a predetermined configuration, the first electrode comprising a grid of individually addressable pixels, each pixel being drivable at one of a number of predetermined voltage levels to provide a local phase modulation to an incident optical signal propagating at least partially in a first dimension; and
a reflective surface structure for reflecting light transmitted through the liquid crystal material back through the material;
the method comprising a step of:
a) depositing at least a first diffractive structure between the reflective surface structure and the liquid crystal material.

24. A method according to claim 23 further comprising the step:
b) depositing a second diffractive structure between the reflective surface and the liquid crystal material.

25. A method according to claim 24 wherein said first and second diffractive structures have different periodicity.

* * * * *